May 5, 1959
C. O. BLISS
2,885,107
CONTAINERS
Filed Aug. 24, 1956
2 Sheets-Sheet 1
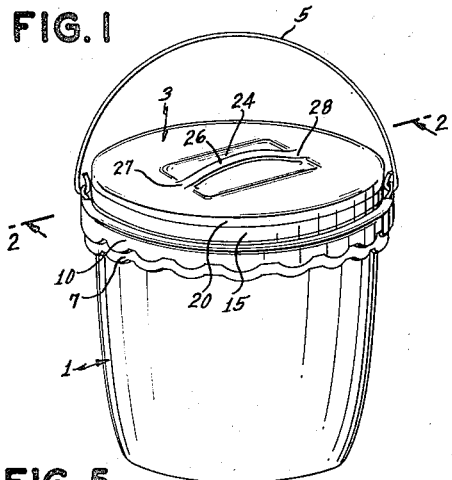
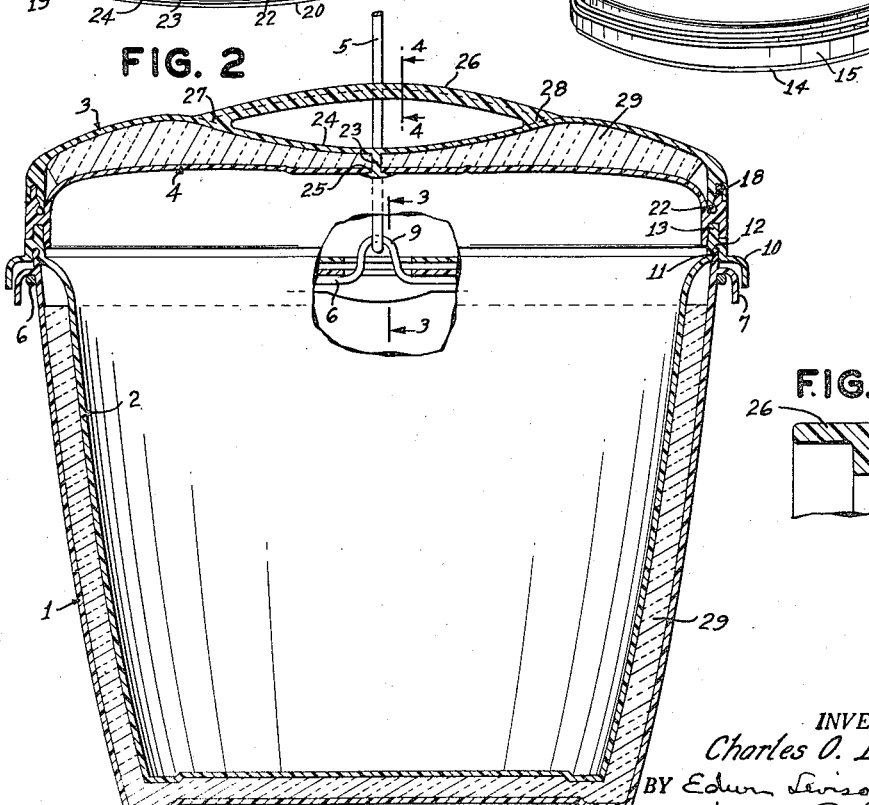
INVENTOR.
Charles O. Bliss
BY Edwin Levisohn
Harry Cohen
ATTORNEYS

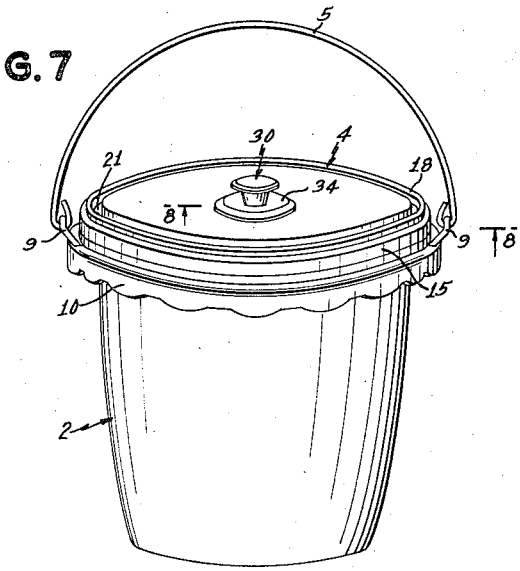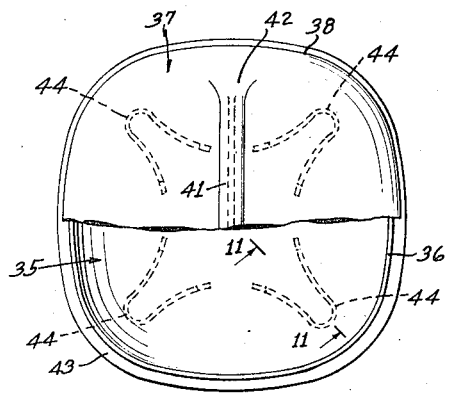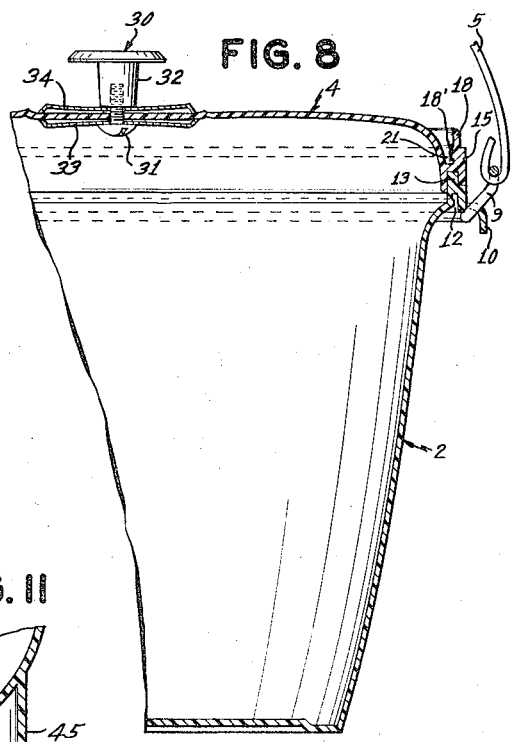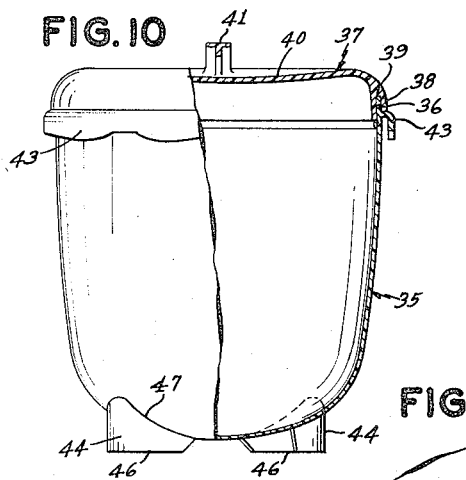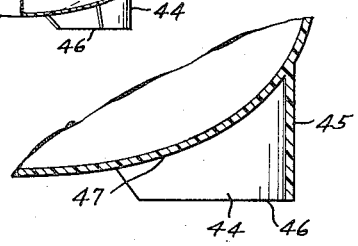

United States Patent Office 2,885,107
Patented May 5, 1959

2,885,107

CONTAINERS

Charles O. Bliss, Los Angeles, Calif.

Application August 24, 1956, Serial No. 605,992

10 Claims. (Cl. 220—17)

My invention relates to containers, and relates more particularly to an improved container and cover construction having utility in the home as storage receptacles for foods, condiments and the like, and outdoors as picnic pails and the like.

It is an object of my invention to provide an improved container and cover construction wherein the material of the container and cover, and the structural details thereof, combine to form a receptacle in which the fit between the cover and the container is so close that a substantially air-tight and/or liquid-tight seal is formed.

Another object of my invention is the provision of a thermally insulated container construction comprising two nested vessels having flanges which cooperate with each other and the interlocking rims of said vessels to add stiffness to the container and to resist deformation thereof.

Another object of my invention is to provide a novel construction for a single walled cover.

Still another object of my invention is the provision of a novel dual walled cover having my interlocking construction.

A further object of my invention is the provision of a novel thermally insulated receptacle formed of a plurality of containers and covers made in accordance with my invention.

Another object of my invention is to provide a novel canister construction.

Other objects of my invention, together with certain details of construction and combinations of parts, will appear from the following description and claims.

In the drawings wherein preferred modifications of my invention are shown,

Fig. 1 is a view in perspective of a thermally insulated container constructed in accordance with my invention, Fig. 2 is a sectional view, partly broken away, taken substantially on the line 2—2 of Fig. 1, Fig. 3 is a sectional view taken substantially on the line 3—3 of Fig. 2, Fig. 4 is a sectional view taken along the line 4—4 of Fig. 2, Fig. 5 is a view in perspective of one cover, Fig. 6 is a view in perspective of another cover, Fig. 7 is a view in perspective of another embodiment of my invention, in the form of a non-insulated container, Fig. 8 is a sectional view, particularly a section taken along the line 8—8 of Fig. 7, Fig. 9 is a top view, partly in section, of another embodiment of my invention, i.e. a kitchen canister, Fig. 10 is a side view, partly in section, of the canister shown in Fig. 9, and Fig. 11 is a sectional view taken along the line 11—11 of Fig. 9.

Like reference numerals indicate like parts throughout the several views of the drawings.

Referring to the drawings for a detailed description of my invention, the embodiment shown in Figs. 1 to 6 comprises a container broadly composed of an outer bucket-shaped vessel 1, an inner bucket-shaped vessel 2, and a closure member comprising an outer wall or cover 3 and an inner wall or cover 4. While I prefer to mold the vessels 1 and 2 and covers 3 and 4, as well as the elements of the canister shown in Figs. 9 to 11, of polyethylene, it will be appreciated that any other suitable thermoplastic molding material may be employed such as, for example, the cellulose ester plastics and the polystyrene plastics. Moreover, the material of the vessels and covers may be transparent, translucent or opaque and in molded form may be resilient, semi-rigid or rigid, depending upon the nature and thickness of the plastic material employed and the purpose for which the container is to be used.

The container is rendered more readily potable by the provision of bail 5 attached to the circumferential supporting hoop or ring 6 encircling the outer vessel 1 under outwardly and downwardly extending flange 7 thereof. The attachment is made by hooking end loops 8 on the bail 5 through loop-forming bends 9 in supporting ring 6 after they are passed through aligned openings or slots in flange 7 of the outer vessel 1 and in flange 10 of the inner vessel 2. The upper rim of vessel 1 is provided not only with the outwardly and downwardly extending flange 7, but also with an upwardly extending circumferential lip 11, while the upper rim of vessel 2 is provided not only with the outwardly and downwardly extending flange 10, but also with a circumferential channel 12 adapted to frictionally engage lip 11, and with an upwardly extending circumferential lip 13 which forms the top edge of the container with the cover removed.

The flange and rim construction of the container modification shown in Figs. 1 to 6 is an important feature of my invention. Thus, when vessel 2 is nested within vessel 1, the flange 10 of vessel 2 is superimposed on flange 7 of vessel 1, and may even be in contact therewith, thereby adding stiffness to the container and greater resistance to deformation thereof. This stiffness and deformation resistance of the container is enhanced by the particular means employed for interlocking the two vessels, i.e. seating the lip 11 in groove 12 (Figs. 2 and 3) adds rigidity and strength, especially in the vicinity of the rims of the vessels, to the vessels already strengthened by the use of the cooperating flanges 7 and 10.

The construction of the closure member employed in the containers of my invention is another feature of my invention, particularly the closure member employed in the embodiment shown in Figs. 1 to 6 where a dual-walled construction is employed. Here inner cover 4 of the closure member is provided with a rim 14 having a laterally extending T-shaped flange 15, the wall 16 of which defines with rim 14 a circumferential channel 17 adapted to engage frictionally the lip 13 of the inner vessel 2, thus forming an effective seal. The flange 15 is also provided with an upwardly extending lip 18, having a projection 18′, which lip is adapted to be received within channel 19 in the rim 20 integral with outer cover 3. As shown in Fig. 3, lip 18 defines the rim 14 of inner cover 4 a circumferential groove 21 which is adapted to receive a protruding lip 22 which with rim 20 defines the channel 19, said lip 22 having a circumferential groove 22′ which is adapted to receive projection 18′ on lip 18. With this lip and groove construction, the covers 3 and 4 may be interlocked to make an effective seal by snapping said covers together, the projection 18′ entering groove 22′ and lip 22 entering groove 21. No cementing or welding of the covers together at their points of contact is required to hold the covers together. Moreover, the precise interlocking of the cover elements make an effective seal.

As shown in Fig. 5, the outer cover is provided on the underside thereof, i.e, below depression 24 in said outer cover, with a lug 23. This lug is employed to join outer cover 3 and inner cover 4 when a dual or insulated cover, such as is shown in Figs. 2 and 3, is desired in which case the lug 23 enters an aperture 25 positioned centrally of said inner cover 4, the lug 23 being then enlarged in any suitable manner as by peening or upsetting as shown in Fig. 2.

Molded integrally with outer cover 3 and spanning depression 24 is a strap-type handle 26 which is joined at the edges thereof to the rim of the depression at 27 and 28 (see Fig. 1).

The spaces between vessels 1 and 2 and between covers 3 and 4 may be filled, if desired, with a thermal insulating material 29 which is preferably in sheet or other self-supporting form. While any suitable thermal insulating material may be employed, such as cork or fibers of glass or asbestos, I prefer to employ sheets of glass fibers. When sheets of insulating material are employed, it will be appreciated that the handling thereof is facilitated, i.e. the sheets may be removed and reinserted without difficulty.

The embodiment of my invention shown in Figs. 7 and 8 illustrates the versatility of my container construction. Thus, the vessel and cover components of my container may be employed separately, as well as being combined to form the construction shown in Figs. 1 to 6. In Figs. 7 and 8, the inner vessel 2 and inner cover 4 of the closure member are used singly. Where used alone, the inner cover 4 is provided with a knob-type of handle 30, which is held in position on the cover by means of a screw 31 threaded into the shaft or neck 32 of the knob-type handle 30, the screw 31 extending through the aperture 25 in said cover 4. Annular pads 33 and 34 of metal, plastic or other suitable material are provided to lend strength and rigidity to the cover and to prevent the tendency of the material of the cover to tear in the area below the handle. The single vessel construction shown in Fig. 8 provides a container having, except for the thermal insulation, substantially all of the desirable attributes of the insulated container shown in Figs. 1 to 6 with respect to the tightness of fit and serviceability thereof.

It will also be appreciated that outer vessel 1 and outer cover 3 may form a separate container which will be of slightly greater capacity than the container illustrated in Figs. 7 and 8. It is also pointed out that the dual closure member made up of covers 3 and 4 is so designed as to fit the rims of each vessel 1 and vessel 2. In other words, the rims of both vessel 1 and vessel 2 are receivable within channels 17 and 19 to form a perfect fit therewith.

The canister shown in Figs. 9 and 10 is composed of a bucket 35, round bottomed for easy cleaning, provided at its upper rim with an upwardly extending lip 36, and a cover 37 provided at its rim 38 with an inverted channel 39 adapted to frictionally engage said lip 36. Cover 37 has a depressed central portion 40 spanned by strap-type integral handle 41 attached to cover 37 at 42 on opposite sides of the depressed portion. Bucket 35 is also provided at its upper rim with an outwardly and downwardly extending flange 43 for added strength. The bottom of bucket 35 is provided with legs 44 which may be integral with said bucket or may be formed from blanks of plastic or other material. The legs 44 present at 45 a straight vertical edge and at 46 a straight horizontal bottom edge and at 47 a curved upper edge adapted to conform with the curved bottom of bucket 35 to which they are attached.

It is to be understood that thermal insulation in the spaces between the inner and outer vessels and in the double walled closure member need not be in sheet form, as stated, but may be in the form of fibrous, porous comminuted, particulate, or other material or may be in the form of a dead air space or vacuum or any combination of these expedients. It will also be understood that the vessels and matching, cooperating covers of my containers may be of any desired cross-sectional shape or configuration, unsymmetrical or symmetrical, circular, square, rectangular, rhomboid, oval, or the like. Although integral molding is the preferred manner of permanently joining together certain elements of my containers, such as the canister of Figs. 9 to 11, any other suitable means may be employed such as cementing, bolting, screwing, riveting or the like or any combination thereof. When elements of my containers are disclosed as being frictionally engaged or in frictional engagement, such elements, as indicated above, may when desired be readily separated. It will be further apparent that the construction details of the container illustrated in Figs. 1 to 6 enables the attainment of substantial advantageous results with respect to reduction of inventories, mass product and the like, since several different types of containers may be constructed by proper combination of the two described bucket-shaped vessels and the two described covers.

This invention has been disclosed with respect to certain preferred embodiments, and various combinations and variations thereof will become obvious to persons skilled in the art. It is to be understood that such modifications and variations are to be included within the spirit and purview of this application and the scope of the appended claims.

What is claimed is:

1. A container comprising an outer vessel having at its upper rim an upwardly extending lip, an inner vessel spaced from said outer vessel and having at its upper rim with an upwardly extending lip and an inverted channel in frictional engagement with said lip of said outer vessel, and a double-walled closure member the walls of which contact each other substantially only at the rims thereof, said closure member having a channelled rim, the channel of which frictionally engages said upwardly extending lip of said inner vessel, the outer wall of said closure member being depressed and attached to the inner wall at its center, and a handle attached to said outer wall on opposite sides of the depressed portion thereof.

2. A container comprising an outer vessel having at its upper rim an upwardly extending lip and an outwardly and downwardly extending flange, an inner vessel spaced from said outer vessel and having at its upper rim an upwardly extending lip, an outwardly and downwardly extending flange, and an inverted channel in frictional engagement with said lip of said outer vessel, said flanges being nested and with said lip in said channel and lip engagement adding rigidity and strength to said container and a double-walled closure member having a channel to frictionally engage said upwardly extending lip of said inner member.

3. A container as defined in claim 2 wherein said flanges have aligned openings, a circumferential supporting member under said flange on said outer vessel, and a bail attached to opposite sides of said supporting member at the aligned openings in said flanges.

4. A container as defined in claim 2 having a double-walled closure member provided with a circumferential channel in the rim thereof cooperating with the lip on said inner vessel to seal said container.

5. A container as defined in claim 4 wherein the spaces between the vessels and between the walls of the closure member is filled with thermal insulating material.

6. A container, comprising a receptacle body portion having a flange at its top, said flange extending downwardly in spaced relation to the outer side of said body portion and provided with a plurality of spaced openings therein, a second receptacle body portion nested within said first mentioned body portion and provided with a flange which overlies said first mentioned flange, said flanges having a plurality of sets of aligned openings, a ring disposed between said first mentioned body portion and its companion flange and having portions extending through said sets of openings, respectively, and a bail connected to said projecting portions of said ring, said bail and ring providing means for carrying the container.

7. A container comprising an outer vessel having a bottom wall and a peripheral wall provided at its upper rim with an outwardly and downwardly extending flange and an upwardly extending lip, and an inner vessel spaced from said outer vessel, said inner vessel having a bottom wall and a peripheral wall provided at its upper rim with an upwardly extending lip, an outwardly and downwardly extending flange, and an open bottom channel in frictional engagement with said lip of said outer vessel, said flanges being nested one within the other and adding strength and rigidity to said container.

8. A container having a double-walled closure member comprising an outer cover having a top wall and an integral downwardly extending peripheral flange, said flange having an open bottom peripheral channel and a downwardly extending lip inwardly of said channel, said lip having an inwardly extending groove at the outer edge thereof, and an inner cover detachably interengaged with said outer cover and having a top wall and an integral downwardly extending peripheral flange, said last mentioned flange having an open top channel and an upwardly extending lip provided with an inwardly extending projection at the inner edge thereof, the lip of each of said covers frictionally engaging the channel of the other of said covers and the projection of the inner cover engaging the groove of the outer cover to hold said covers together when they are interengaged.

9. A lipped container having a double-walled closure member comprising an outer cover having a top wall and an integral downwardly extending peripheral flange, said flange having an open bottom peripheral channel and a downwardly extending lip inwardly of said channel, said lip having an inwardly extending groove at the outer edge thereof, and an inner cover detachably interengaged with said outer cover and having a top wall and an integral downwardly extending peripheral flange, said last mentioned flange having an open top channel and an upwardly extending lip provided with an inwardly extending projection at the inner edge thereof, the lip of each of said covers frictionally engaging the channel of the other of said covers and the projection of the inner cover engaging the groove of the outer cover to hold said covers together when they are interengaged, the peripheral flange of said inner cover having an open bottom channel for receiving and frictionally engaging the lip of said container to seal said container.

10. A container having a double-walled closure member comprising an outer cover having a top wall and an integral downwardly extending peripheral flange, said flange having an open bottom peripheral channel and a downwardly extending lip inwardly of said channel, said lip having an inwardly extending groove at the outer edge thereof, and an inner cover detachably interengaged with said outer cover and having a top wall and an integral downwardly extending peripheral flange, said last mentioned flange having an open top channel and an upwardly extending lip provided with an inwardly extending projection at the inner edge thereof, the lip of each of said covers frictionally engaging the channel of the other of said covers and the projection of the inner cover engaging the groove of the outer cover to hold said covers together when they are interengaged, and means for joining said covers at a point substantially centrally thereof.

References Cited in the file of this patent
UNITED STATES PATENTS

| | | |
|---|---|---|
| 393,144 | Cragin | Nov. 20, 1888 |
| 1,819,851 | Vandegrift | Aug. 18, 1931 |
| 2,606,586 | Hill | Aug. 12, 1952 |
| 2,690,853 | Kircher | Oct. 5, 1954 |
| 2,695,115 | Roop | Nov. 23, 1954 |
| 2,765,832 | Tupper | Oct. 9, 1956 |
| 2,766,796 | Tupper | Oct. 16, 1956 |
| 2,776,691 | Tupper | Jan. 8, 1957 |

FOREIGN PATENTS

| | | |
|---|---|---|
| 463,747 | Canada | Mar. 14, 1950 |
| 663,827 | Great Britain | Dec. 27, 1951 |
| 738,282 | Great Britain | Oct. 12, 1955 |